No. 729,875. PATENTED JUNE 2, 1903.
J. LATILLE.
CHANGE SPEED GEAR.
APPLICATION FILED MAY 31, 1902.
NO MODEL.
FIG. 1.
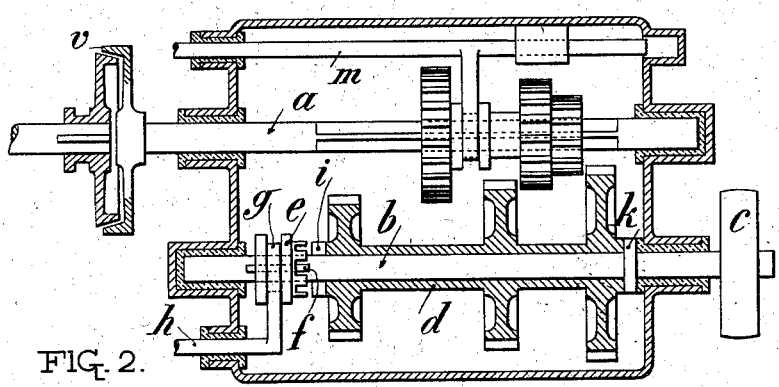
FIG. 2.
FIG. 3.
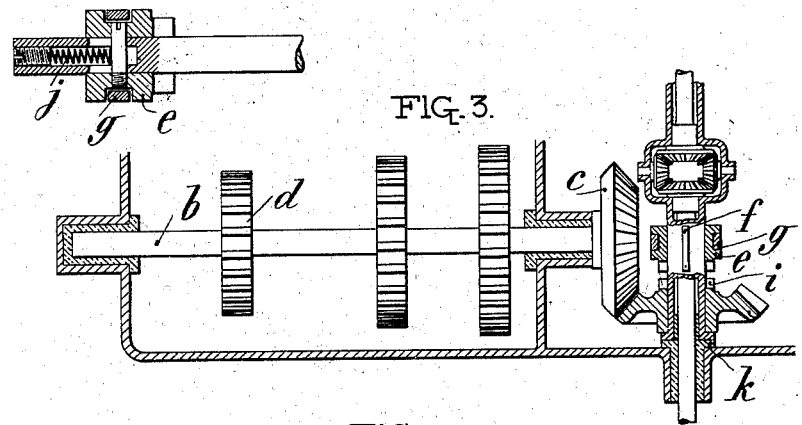
FIG. 4.
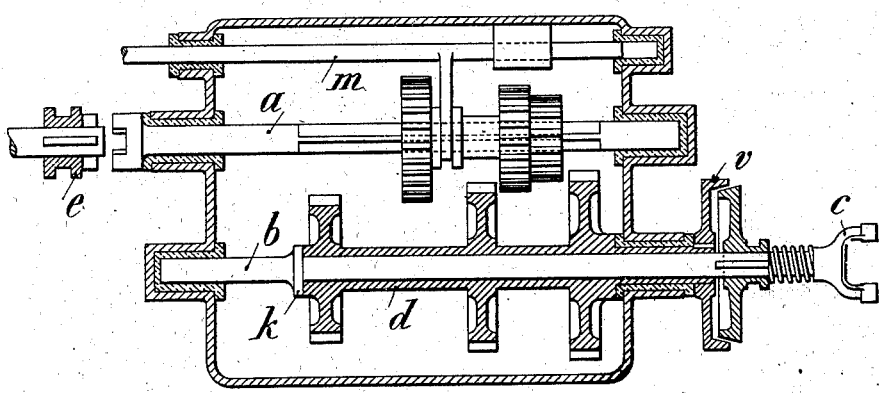
Witnesses:
Inventor
Jules Latille,
By Wm. E. Boulter
Attorney No. 729,875. Patented June 2, 1903.

UNITED STATES PATENT OFFICE.

JULES LATILLE, OF LEVALLOIS-PERRET, FRANCE.

CHANGE-SPEED GEAR.

SPECIFICATION forming part of Letters Patent No. 729,875, dated June 2, 1903.

Application filed May 31, 1902. Serial No. 109,715. (No model.)

*To all whom it may concern:*

Be it known that I, JULES LATILLE, a citizen of the Republic of France, residing at Levallois-Perret, France, have invented certain new and useful Improvements in or Relating to Change-Speed Gears, of which the following is a specification.

The present invention relates to a change-speed gear, which has for its object to allow during the speed-changing operation one part of the gear to run loose while maintaining the rotation of the other part in order to allow of an engagement of the two gearing mechanisms.

In the drawings, Figure 1 is a longitudinal section through the axis of a change-speed gear according to my invention. Fig. 2 is a modified construction of the clutch shown in Fig. 1. Fig. 3 is a longitudinal view, partly in section, of a modified construction of the gear wherein bevel-gearing is employed. Fig. 4 is a view similar to Fig. 1 with certain modifications in the arrangement of the mechanism.

In various speed-gears actually in use the driven gear-wheels are in one with the rest of the driven member, and it follows that when one wishes to throw any of these gears into engagement with its corresponding driving member the latter is forced to change its speed to that of the other gear, thus producing shocks, breakages, wear, and a grinding action of the teeth of the engaging wheels. These drawbacks are overcome by the arrangement according to the present invention, which consists in isolating either, first, the driving gear-wheels or, second, the driven gear-wheels; third, the receiving-gear, consisting of a shaft in one with the wheels or also with the operating parts of the gear.

In the arrangement shown, for example, in Fig. 1 the motor or driving shaft $a$ is operated as usual through a coupling V of any construction. The shaft being square in cross-section causes the driving-gear, which is mounted on a sleeve on the shaft, to rotate with it, while it has, however, a sliding motion thereon.

The driven mechanism is composed of two parts—first, the driven shaft $b$, to which is fixed the transmitting member or pulley $c$, which can be of any construction—for instance, an ordinary toothed wheel or a bevel-wheel, a pulley, or a Cardan joint, &c.; second, the sleeve $d$, carrying the driven gear-wheels, loosely mounted upon the shaft $b$.

A coupling member $e$, adapted to connect the shaft $b$ with the sleeve $d$ by means of a wedge or key $f$, is capable of being moved longitudinally on the shaft $b$ with the aid of a fork $h$, the ends $g$ of which engage a circular groove in the coupling member $e$, so as to effect or to break the connection with the corresponding coupling member $i$, and consequently between the driven shaft $b$ and the sleeve $d$. A modification of this arrangement consists in mounting the transmitting member $c$ loosely upon the driven shaft $b$. This member $c$, which can be either a flat or a bevel toothed wheel, or a pulley, or a Cardan joint, transmits the motion from the driven shaft to the carriage or other driven part and can be made integral with or rigidly connected to the driven shaft $b$ by means of a coupling-sleeve, of the same construction as above described.

In Fig. 3 the driven gear consists of the driven shaft $b$, rigidly connected or integral with the driven gear-wheels $d$ and with the transmitting gear-wheel $c$. The coupling-sleeve $e$ is in this case interposed between the transmitting member $c$ or its connected parts and the ordinary differential gear.

In all these constructions the coupling-sleeve $e$ is maintained in engagement with its counterpart $i$ by a fork $h$ or by means of a spring $j$, arranged inside the shaft $b$, Fig. 2.

When it is desired to change the speed, the driving-shaft of the motor is first thrown out of gear. During the last portion of this motion the fork is operated, which by displacing the coupling-sleeves renders loose either the driven member or the driving-gear or the transmitting member or the whole driven gear. Then the change in the speed is effected by moving the selected gear-wheel of the driving-gear (rotating only at its acquired speed) in gear with its corresponding driven wheel. After this the driving-shaft is coupled with the driving-shaft of the motor. During the first part of the motion for effecting the coupling the coupling-sleeve is brought back to its initial position, and the connection of the loose members being thus reëstablished the coupling operation is finished.

A modified construction is shown by way of example in Fig. 4 and consists in establishing or breaking the connection of the various parts with the aid of a convenient friction-clutch $v$, which is usually placed between the motor, and the motor-shaft $a$ is replaced by a toothed coupling $e$. In order to change the speed, either the driving gear-wheels or the driven gear-wheels can be displaced; but they must always rotate with their corresponding shaft. The driven shaft $b$ can be square and can be arranged to slide in the tubular part or sleeve of the driven member. Any of the parts of the coupling, or even both, can be fixed thereto, in which case, however, the clutch portion, which is rigid with the transmitting member $c$, is loose upon the shaft. Whatever may be the arrangement employed the friction-clutch will serve for the connection between the driven part of the change-speed gear and the differential gear. The operation of this latter modification is the same as that shown in Figs. 1 and 2.

What I claim as my invention, and desire to secure by Letters Patent, is—

1. A change gear comprising a driving-shaft, a sleeve longitudinally movable upon said shaft and rotatable therewith, gear members carried by said shaft, a driven shaft, gear members mounted thereon, a driven part and a coupling between said driven shaft and the driven part, substantially as described.

2. In a change-speed gear a driving-shaft, a sleeve longitudinally movable upon said shaft and rotatable therewith, gear members carried by said sleeve, a driven shaft, a sleeve thereon, gear members mounted on said sleeve and a coupling adapted to connect the driven gear members with the part to be driven substantially as described.

3. In a change-speed gear a driving-shaft, a sleeve longitudinally movable upon said shaft and rotatable therewith, gear members carried by said sleeve, a driven shaft, a sleeve thereon, gear members mounted on said sleeve and a coupling between the sleeve and the driven shaft substantially as described.

In testimony whereof I have signed my name to this specification in the presence of two subscribing witnesses.

JULES LATILLE.

Witnesses:
LOUIS SULLIGER,
EDWARD P. MACLEAN.